US 8,166,280 B2

(12) United States Patent
Strom

(10) Patent No.: US 8,166,280 B2
(45) Date of Patent: *Apr. 24, 2012

(54) MICROPROCESSOR FOR EXECUTING BYTE COMPILED JAVA CODE

(75) Inventor: Oyvind Strom, Trondheim (NO)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,984

(22) Filed: Feb. 18, 2011

(65) Prior Publication Data

US 2011/0145548 A1 Jun. 16, 2011

Related U.S. Application Data

(63) Continuation of application No. 11/619,923, filed on Jan. 4, 2007, now Pat. No. 7,917,732, which is a continuation of application No. 10/114,678, filed on Apr. 1, 2002, now abandoned.

(60) Provisional application No. 60/286,197, filed on Apr. 23, 2001.

(51) Int. Cl.
*G06F 9/00* (2006.01)

(52) U.S. Cl. ........................................ 712/209

(58) Field of Classification Search ................ 712/209
See application file for complete search history.

(56) References Cited

U.S. PATENT DOCUMENTS

| | | |
|---|---|---|
| 5,696,959 A | 12/1997 | Guttag et al. |
| 5,812,868 A | 9/1998 | Moyer et al. |
| 5,937,193 A | 8/1999 | Evoy |
| 5,978,901 A | 11/1999 | Luedtke |
| 6,021,469 A | 2/2000 | Tremblay et al. |
| 6,026,485 A | 2/2000 | O'Connor et al. |
| 6,076,155 A | 6/2000 | Blomgren et al. |
| 6,324,686 B1 | 11/2001 | Komatsu et al. |
| 6,332,215 B1 | 12/2001 | Patel et al. |
| 6,338,160 B1 | 1/2002 | Patel et al. |
| 6,654,954 B1 | 11/2003 | Hicks |
| 6,826,749 B2 | 11/2004 | Patel et al. |
| 6,990,567 B1 | 1/2006 | Cohen et al. |
| 2004/0015678 A1 | 1/2004 | Strom |
| 2007/0168954 A1 | 7/2007 | Strom |

FOREIGN PATENT DOCUMENTS

WO WO-9722924 A1 6/1997

(Continued)

OTHER PUBLICATIONS

"U.S. Appl. No. 11/619,923, Notice of Allowance mailed Dec. 13, 2010", 7 pgs.

(Continued)

*Primary Examiner* — Chun-Kuan Lee
*Assistant Examiner* — Benjamin Geib
(74) *Attorney, Agent, or Firm* — Fish & Richardson P.C.

(57) ABSTRACT

A microprocessor architecture for executing byte compiled Java programs directly in hardware. The microprocessor targets the lower end of the embedded systems domain and features two orthogonal programming models, a Java model and a RISC model. The entities share a common data path and operate independently, although not in parallel. The microprocessor includes a combined register file in which the Java module sees the elements in the register file as a circular operand stack and the RISC module sees the elements as a conventional register file. The integrated microprocessor architecture facilitates access to hardware-near instructions and provides powerful interrupt and instruction trapping capabilities.

20 Claims, 13 Drawing Sheets

FOREIGN PATENT DOCUMENTS

| | | |
|---|---|---|
| WO | WO-9727537 A2 | 7/1997 |
| WO | WO-0034844 A2 | 6/2000 |
| WO | WO-02086699 A2 | 10/2002 |

OTHER PUBLICATIONS

"ARM Architecture Extensions for Java Applications", Jazelle website, 6 pages.

"International Application Serial No. PCT/US02/10389, International Preliminary Examination Report with Written Opinion dated Aug. 19, 2003", 9 pgs.

"International Application Serial No. PCT/US02/10389, International Search Report mailed Feb. 17, 2003", 5 pgs.

"JazelleTM Technology for Java Applications", Jazelle website, ARM Product Information, 4 pages.

"Republic of Korean Application Serial No. 10-2003-7013746, Office Action mailed Apr. 28, 2008", 8 pgs.

Betts, A. K, et al., "SMILE: A Scalable Microcontroller Library Elements", Microprocessing and Microprogramming, vol. 39(Issue 2-5), (1993), 259-262.

Clarke, P., "ARM Tweaks CPU Schemes to Run Java", Electronic Engineering Times, CMP Media, Inc., (c) Oct. 2000, 2 pgs.

Strom, O., et al., "A Novel Microprocessor Archicture for Executing Byte Compiled Java Code", Dept.of Physical Electronics, Norweagian Universityof Science and Technology, (2000).

Strom, O., et al., "A Study of Dynamic Instruction Frequencies in Byte Compiled Java Programs", Proceedings of Euromicro, 4 pages, (Sep. 1999).

Strom, O., "VLSI Realization of an Embedded Microprocessor Core with Support for Java Instructions", Ph.D. thesis, Norwegian University of Science and Technology, 160 pages, (Nov. 2000).

Strom, Oyving, et al., "A Novel Approach for Executing Byte Compiled Java Code in Hardware", ICCA Newsletter, (Jun. 2000).

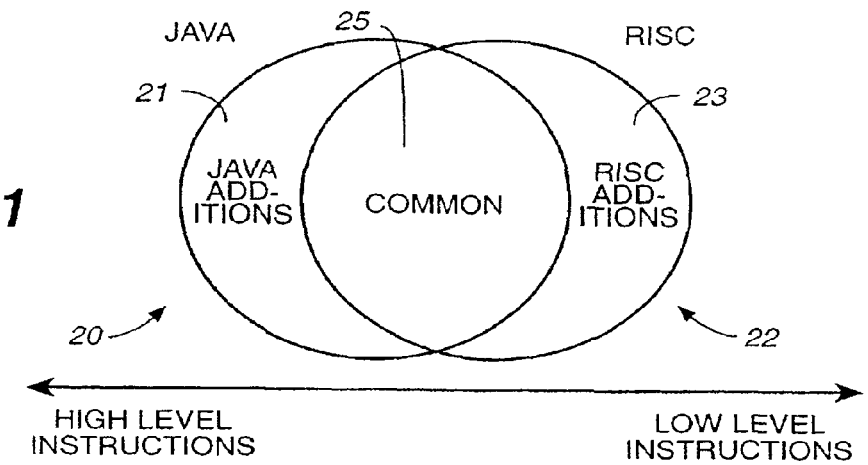
FIG._1
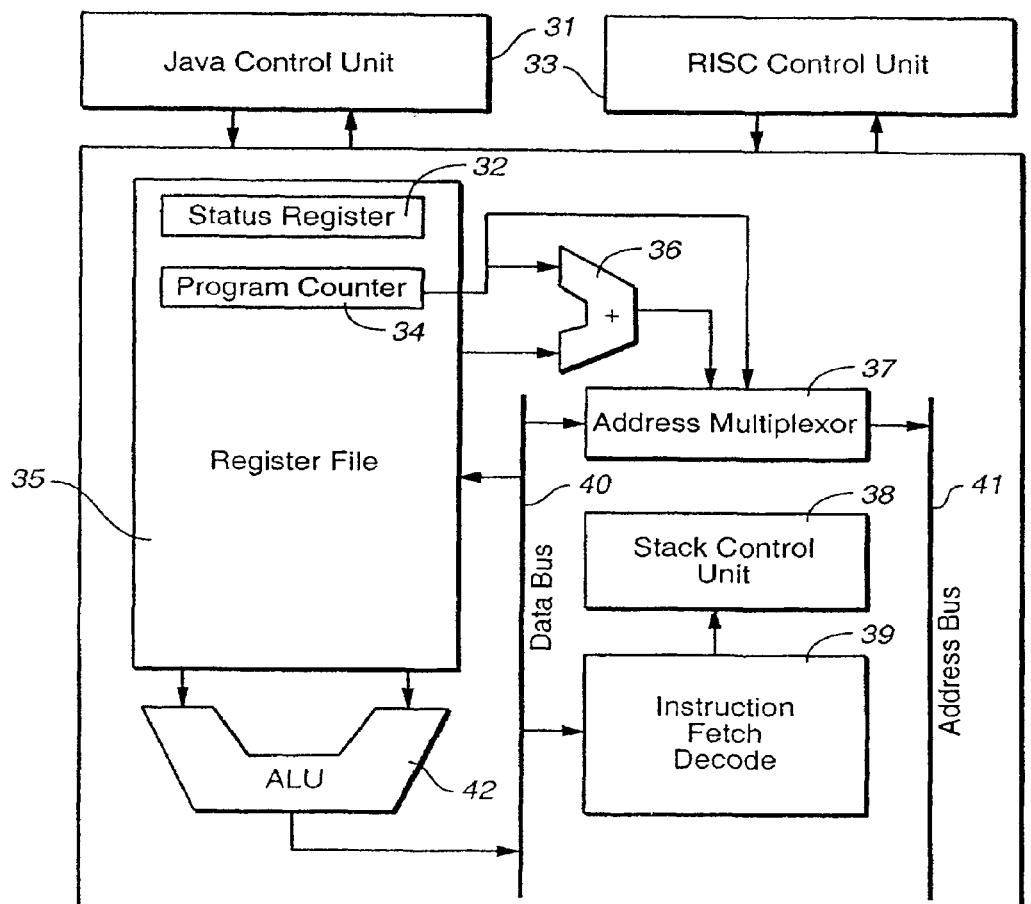
FIG._2

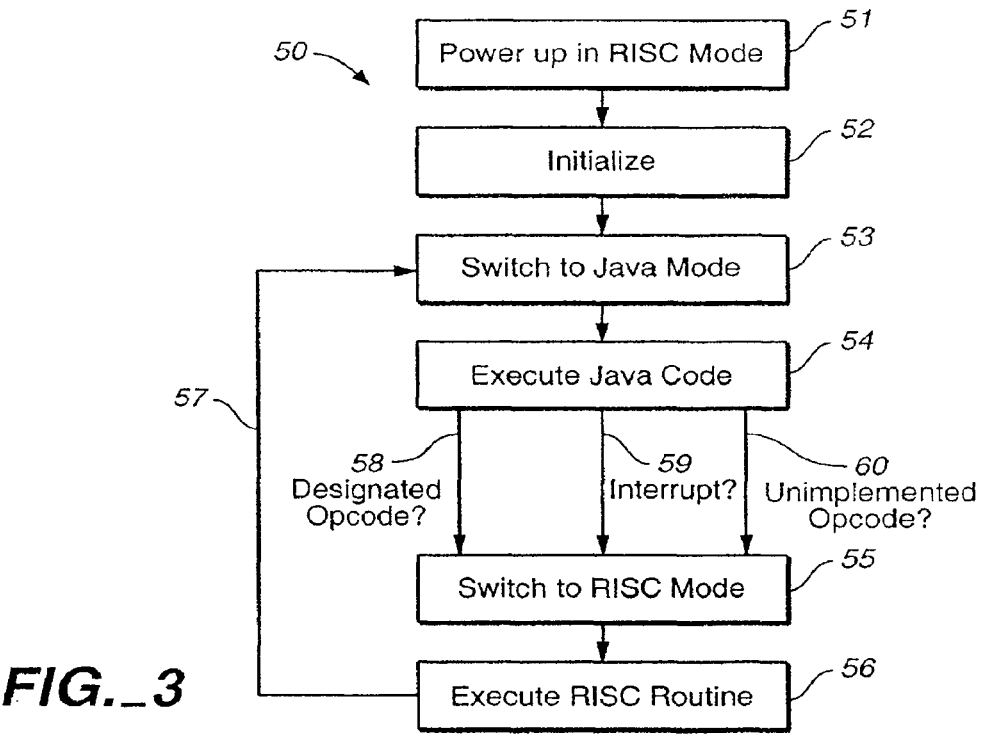
FIG._3
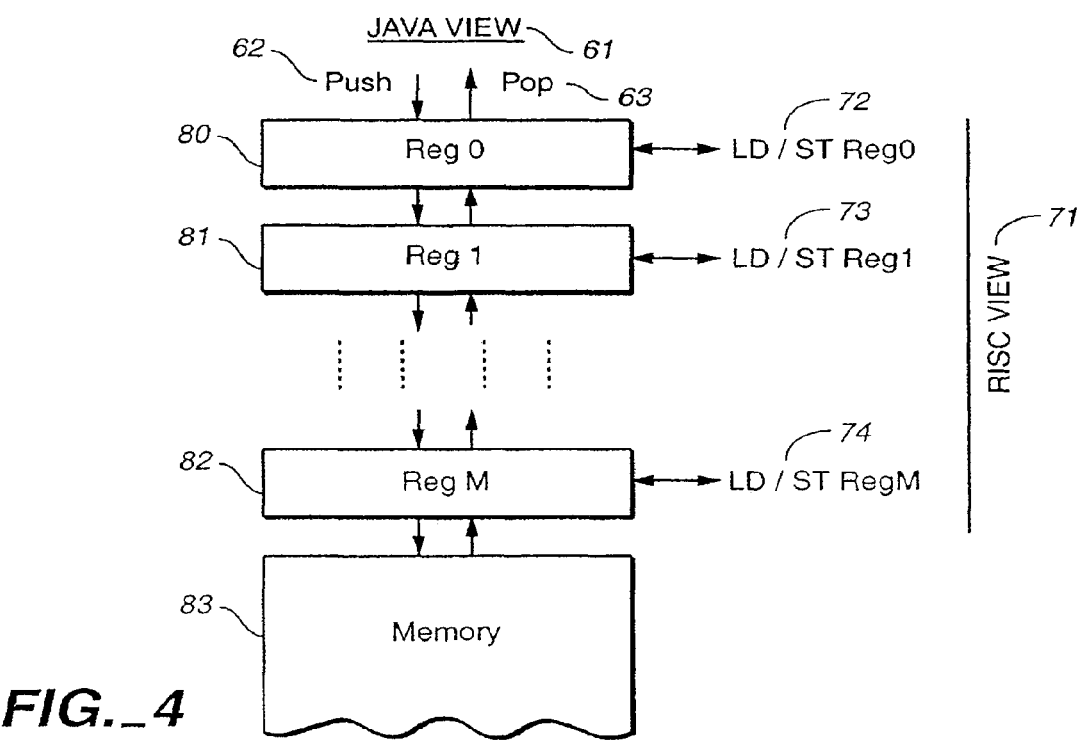
FIG._4

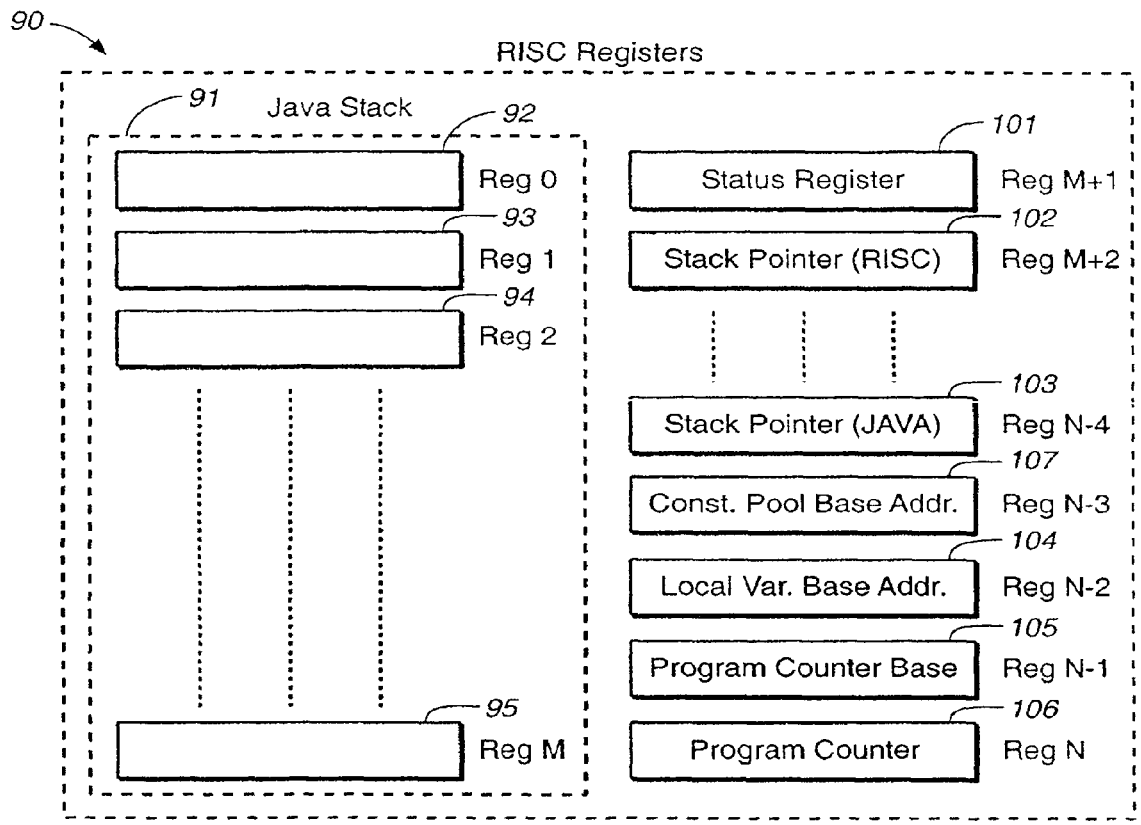
FIG._5
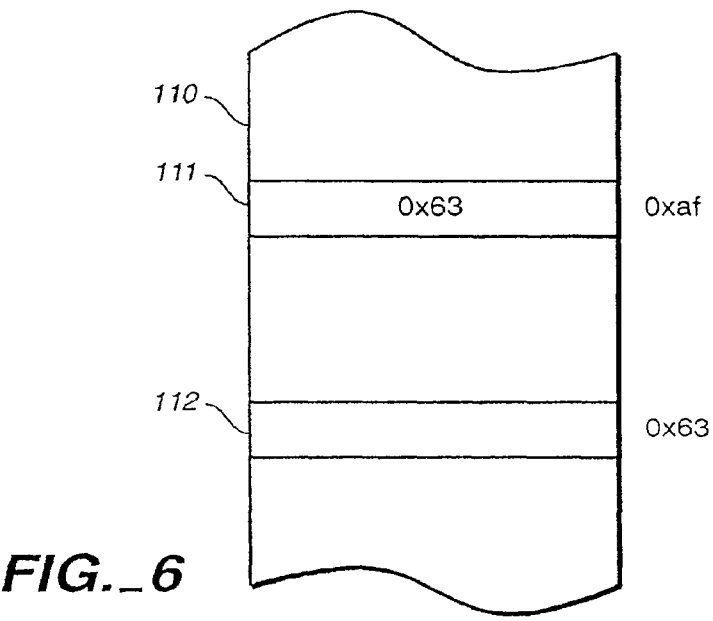
FIG._6

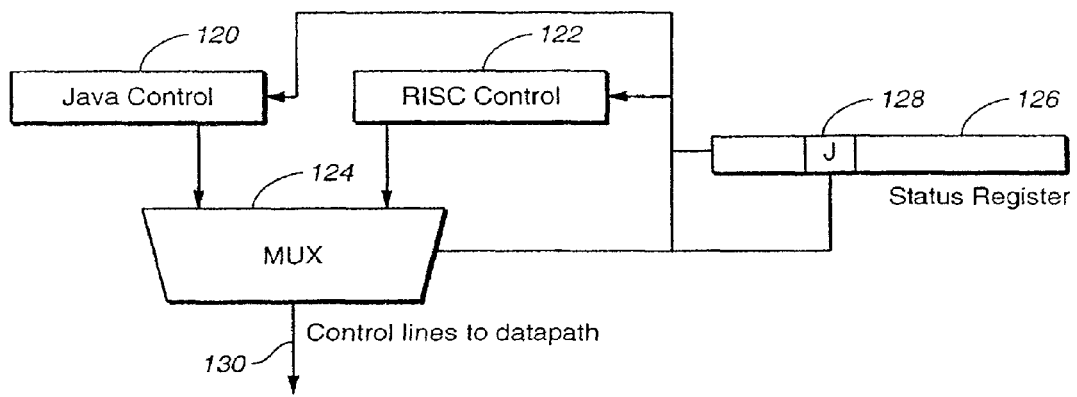
FIG._7
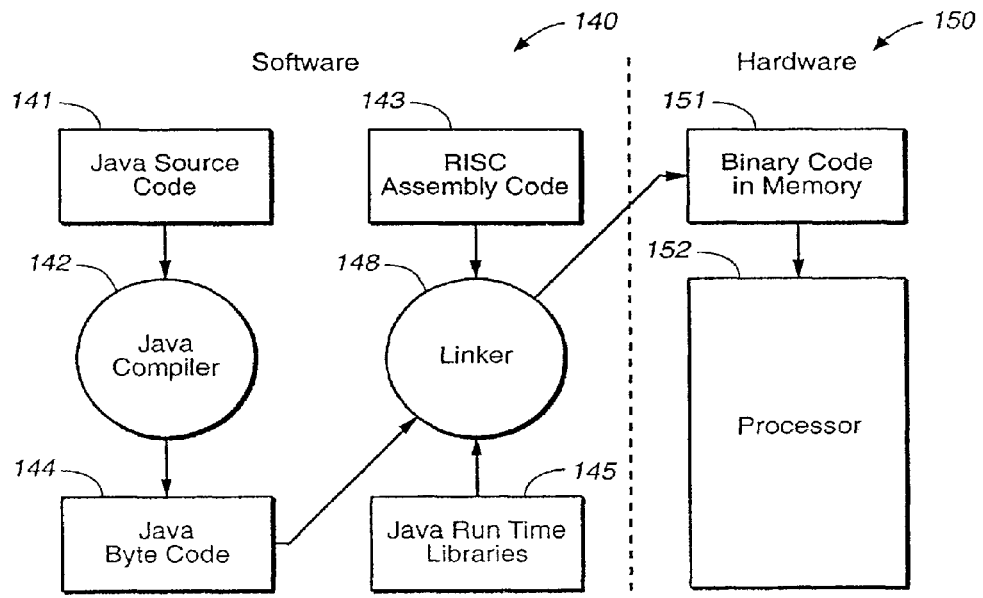
FIG._8

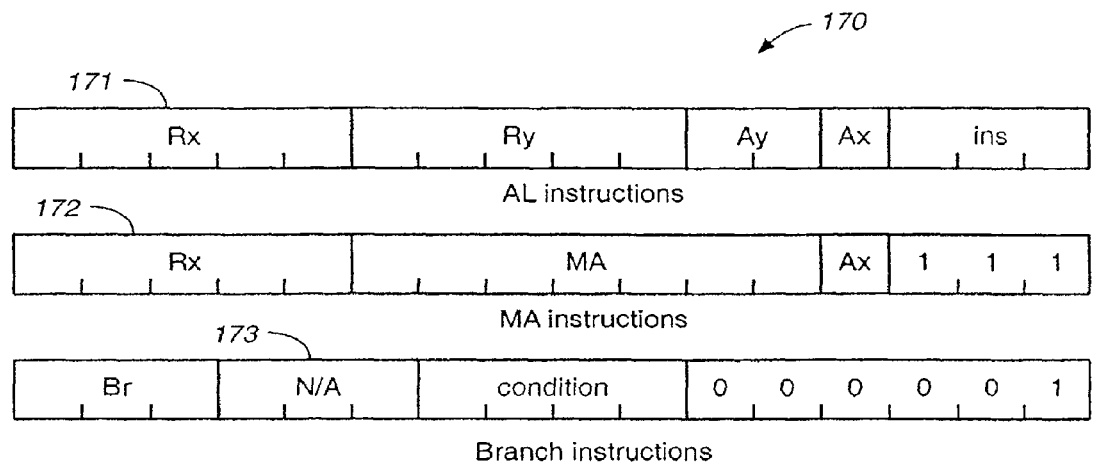
FIG._9
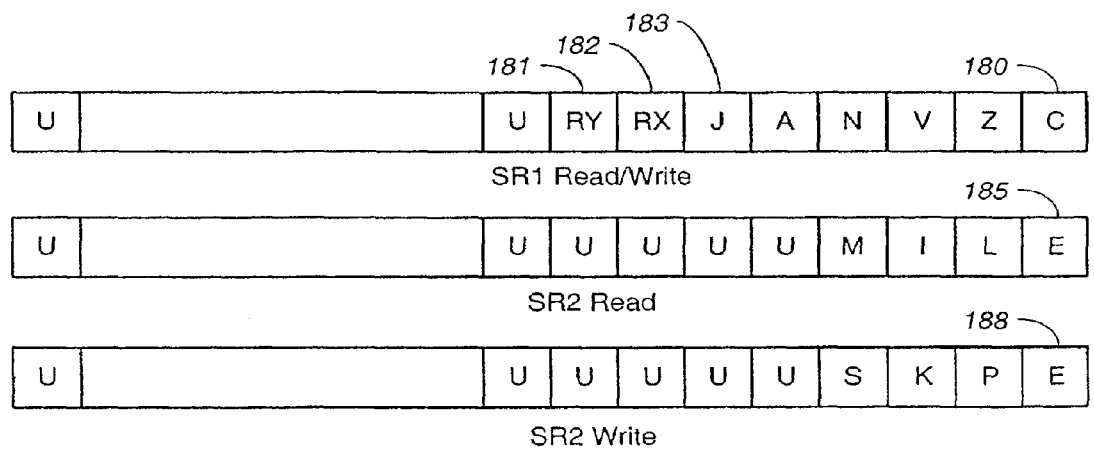
FIG._10

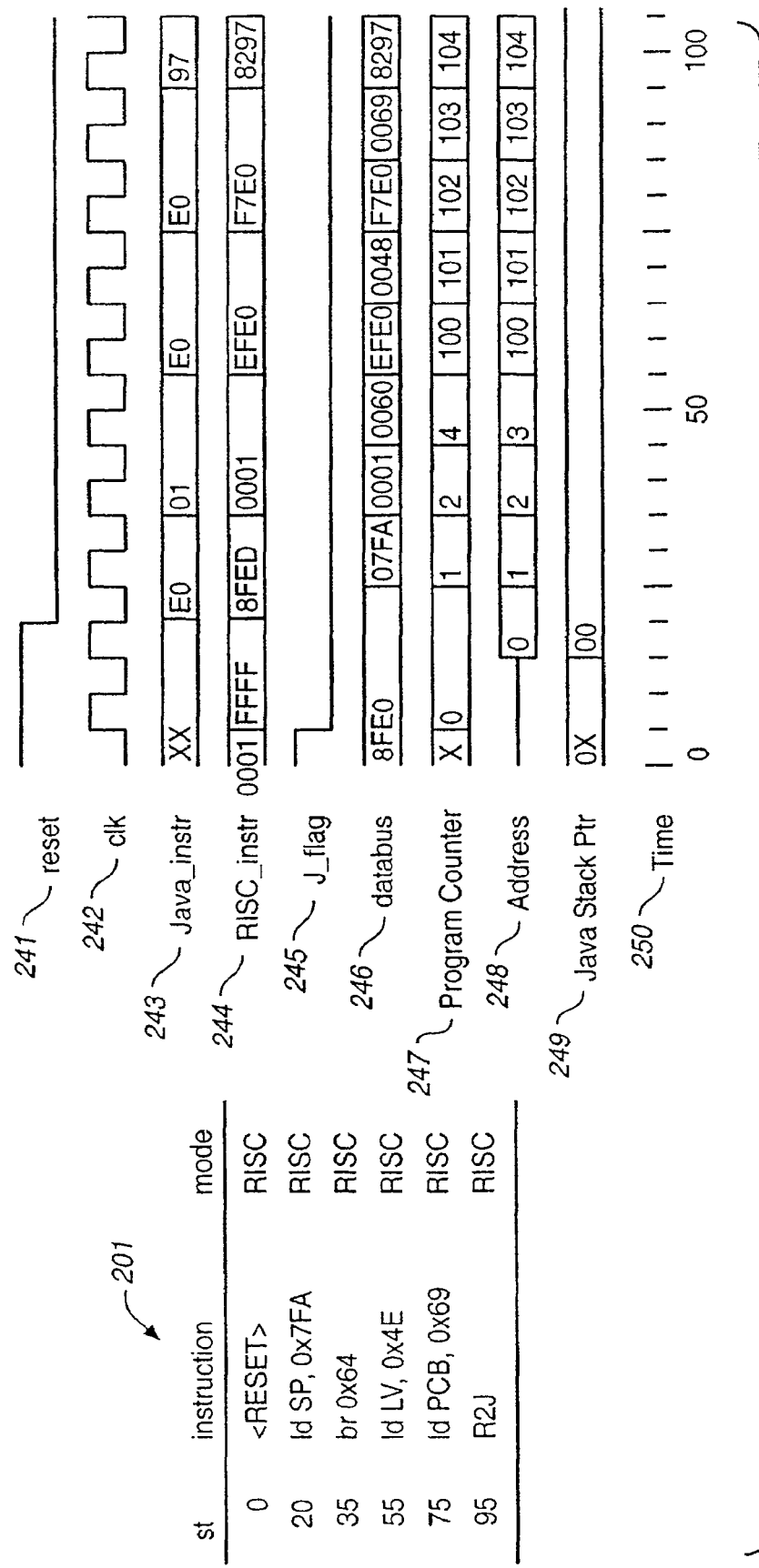
FIG._11

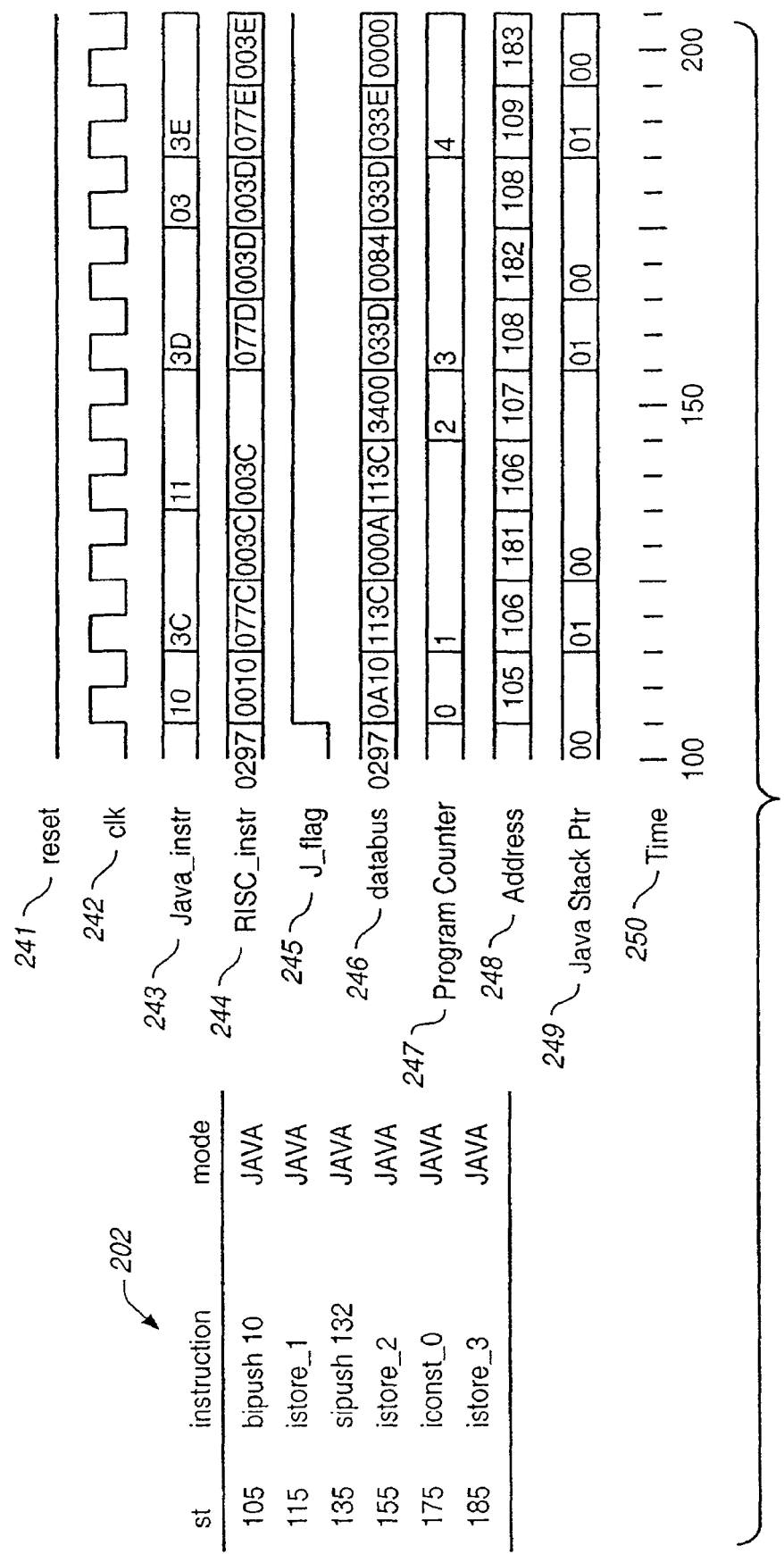
FIG._12

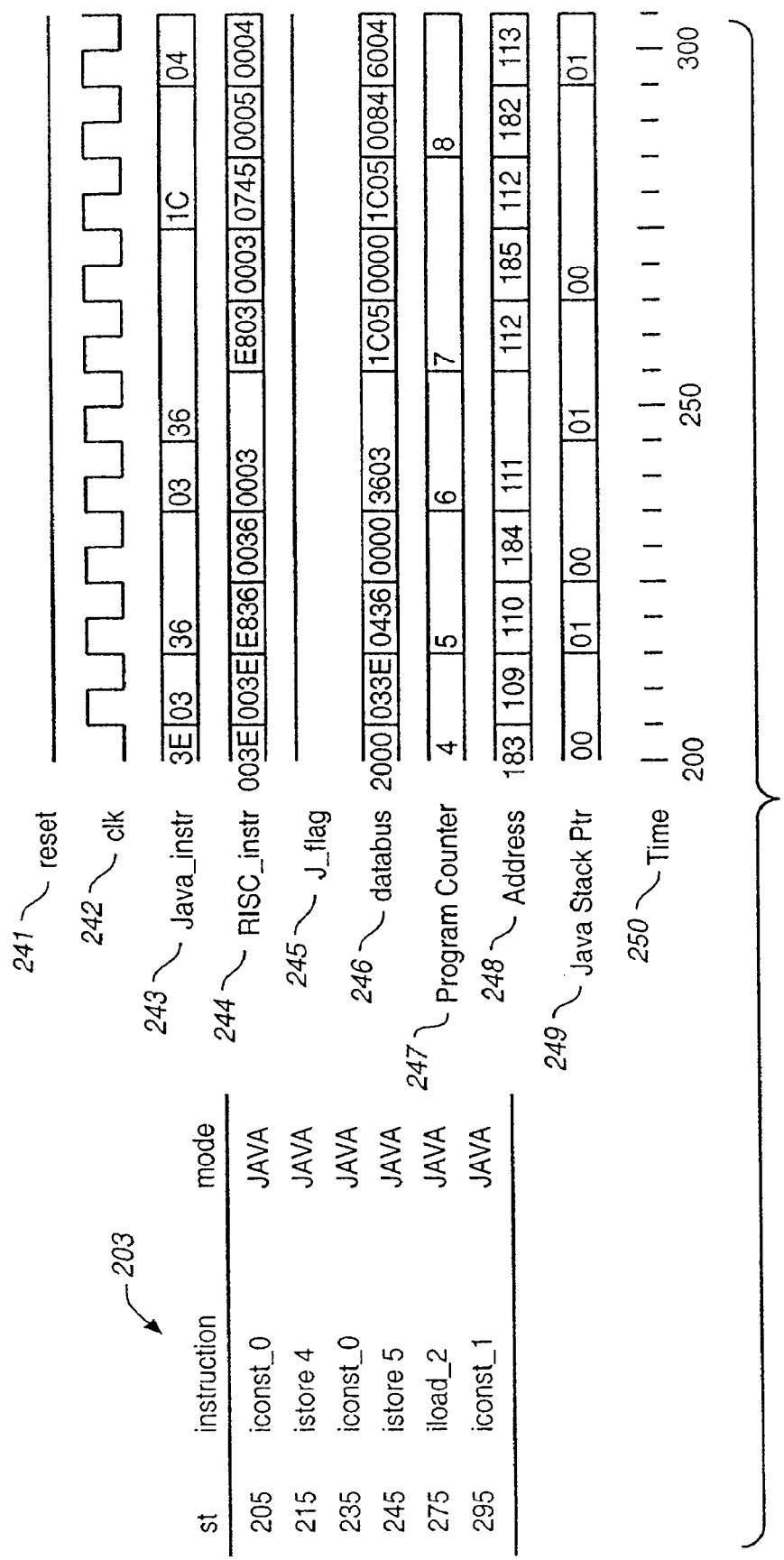
FIG._13

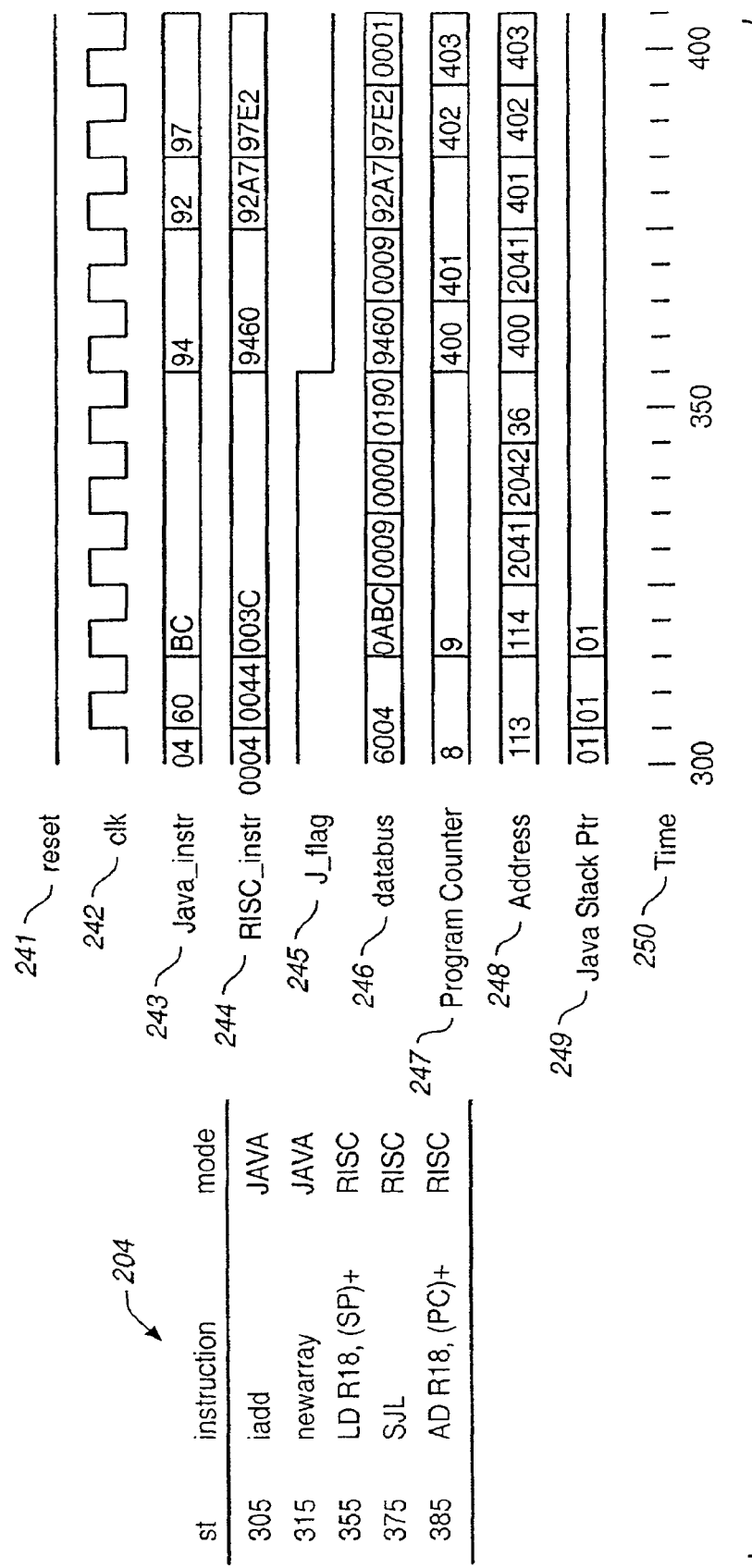
FIG._14

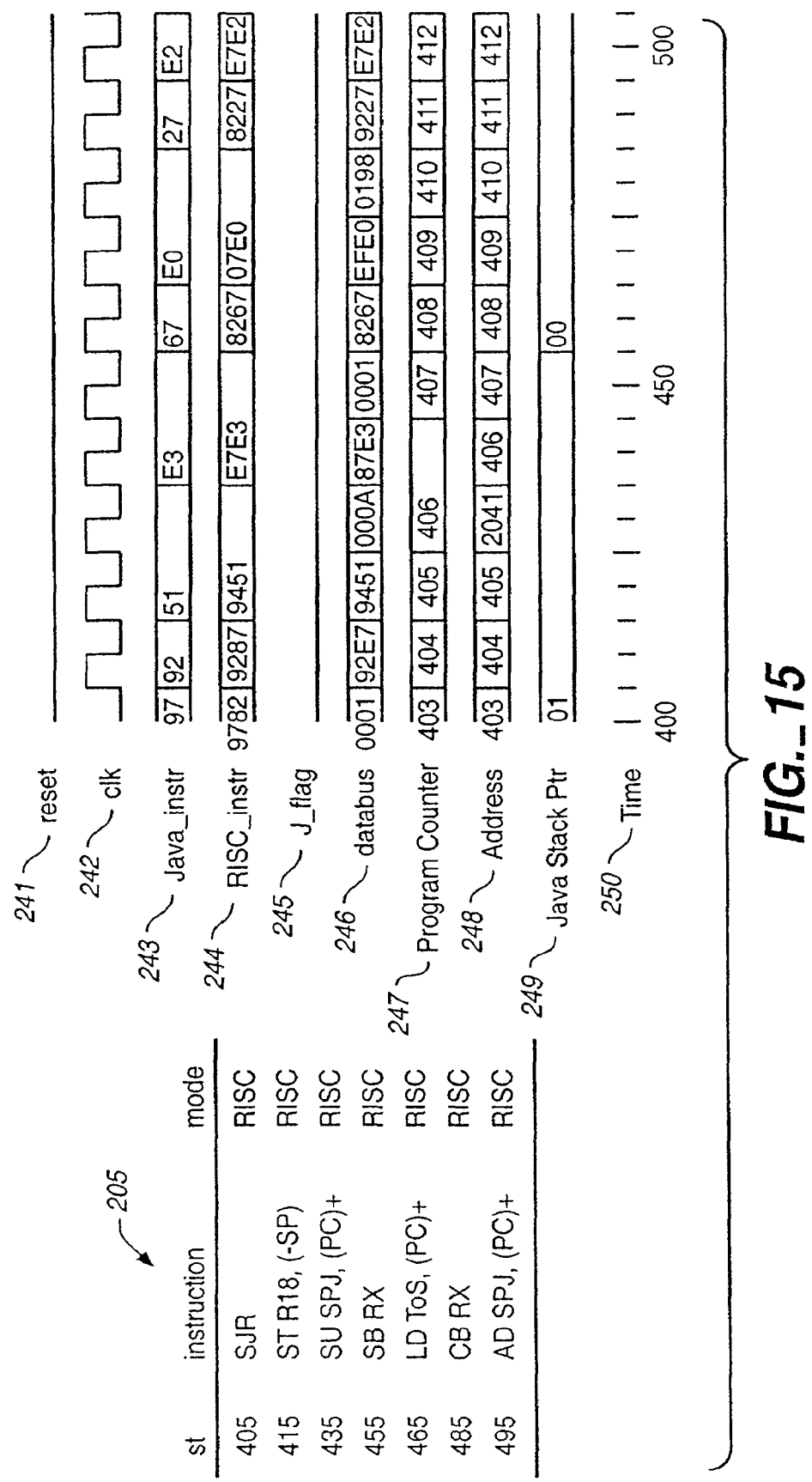
FIG._15

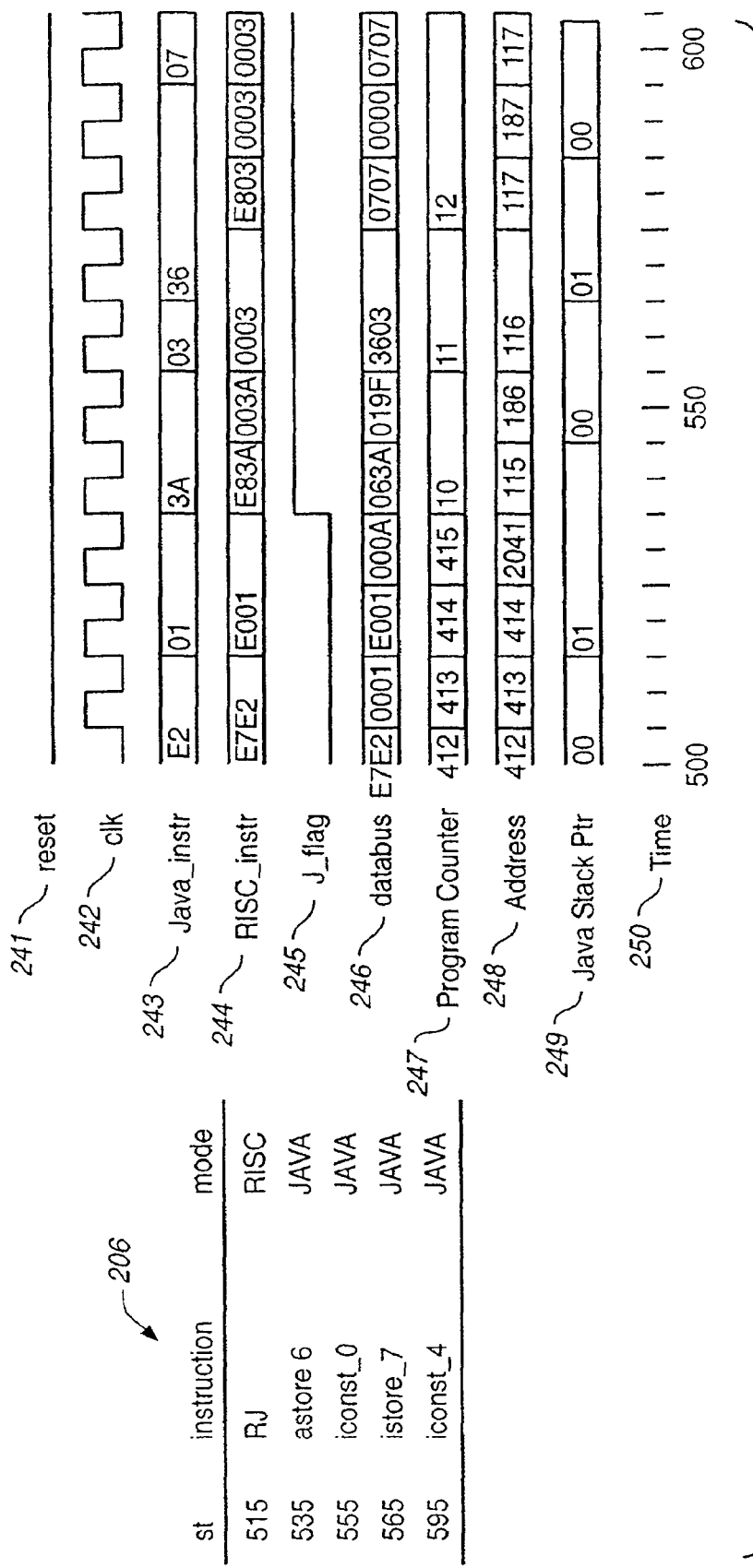
FIG._16

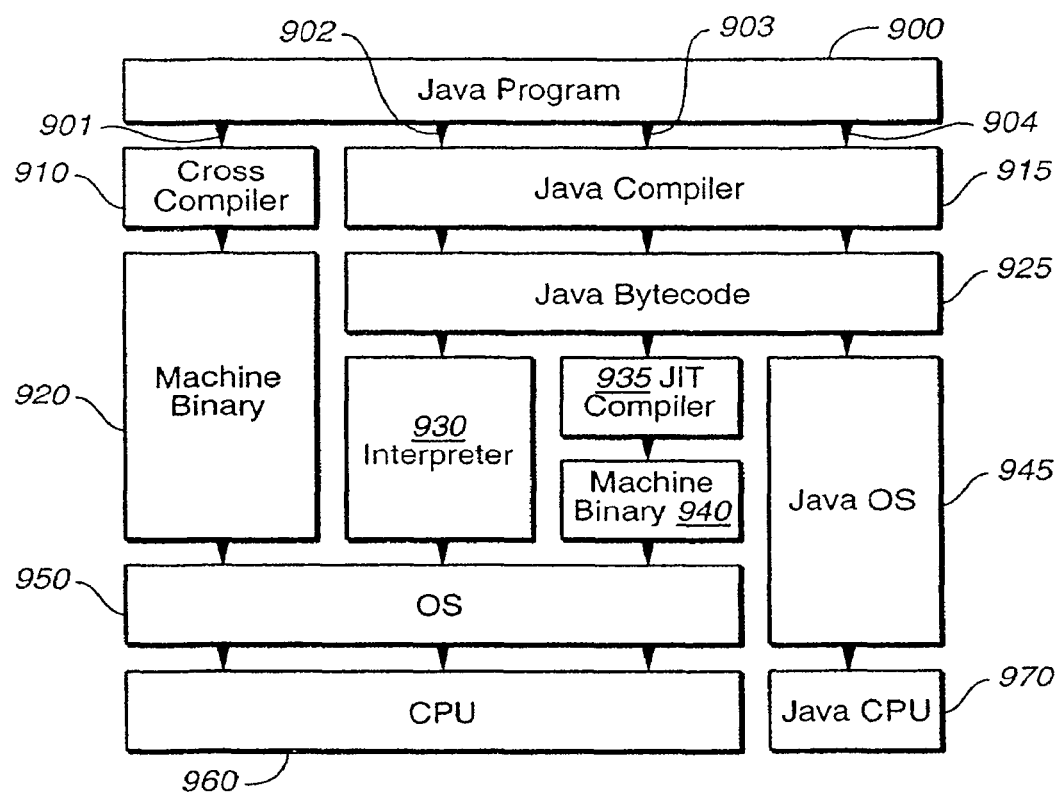
FIG._17
(PRIOR ART)

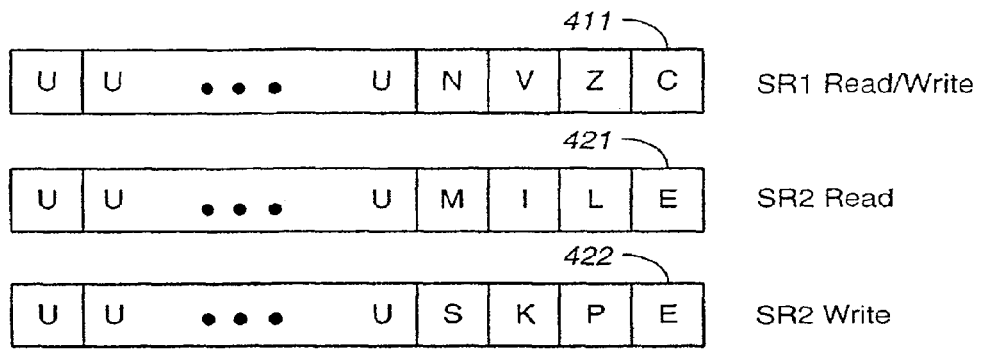
FIG._18
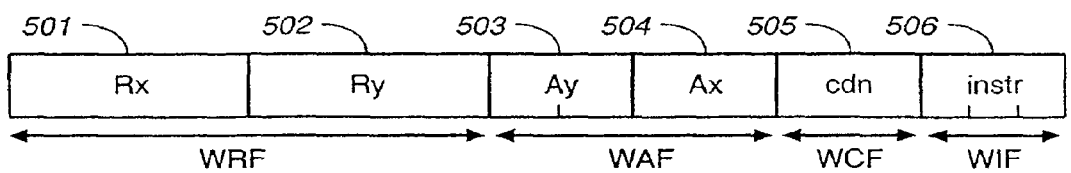
FIG._19
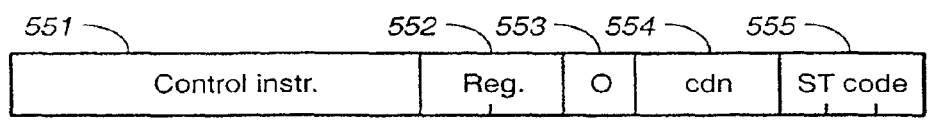
FIG._20
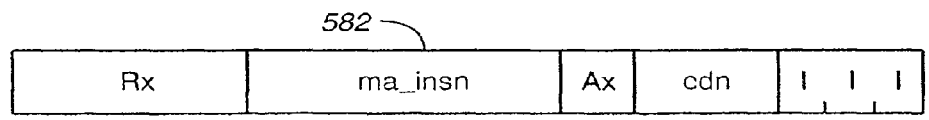
FIG._21

MICROPROCESSOR FOR EXECUTING BYTE COMPILED JAVA CODE

CROSS-REFERENCE TO RELATED APPLICATION

This application is a continuation of U.S. application Ser. No. 11/619,923, filed on Jan. 4, 2007, which is a continuation of U.S. application Ser. No. 10/114,678, filed Apr. 1, 2002, which claims the benefit of U.S. Provisional Application Ser. No. 60/286,197, filed on Apr. 23, 2001, all of which are incorporated herein by reference in their entirety.

TECHNICAL FIELD

The invention relates generally to microprocessors, and more specifically to a microprocessor with a JAVA Virtual machine core architecture.

BACKGROUND ART

JAVA is an object oriented programming language that has become a de facto standard in network programming. At the present time, JAVA is also beginning to be utilized in the domain of embedded systems, or systems that contain a microprocessor or a microcontroller. Some of the strong points of the JAVA environment like its object orientation, automatic garbage collection and run time security features can be used with success in embedded applications. However, its run time environment presents a challenge for system designers because of the resource overhead related to running the JAVA code in a virtual machine such as an interpreter or a just-in-time compiler. The JAVA binary code, called bytecode, is distributed in one or more class files. Bytecodes are the instructions of a hypothetical computer that is specifically designed for the execution of JAVA programs. Conventional CPUs cannot execute this bytecode and therefore execute it in a software layer called the JAVA Virtual machine. This machine is an abstract machine specification and no implementation guidelines are given. The JAVA Virtual Machine Specification is published by Sun Microsystems.

With reference to FIG. 17, there are basically four ways to execute a JAVA program on a physical computer platform. In a first method 902, the opcode is computed in a JAVA compiler 915 and the JAVA bytecode 925 is sent to an interpreter 930 before being sent to the operating system 950 and being executed by the CPU 960. However, the interpreter 930 presents a speed penalty of a factor of five compared to executing a program compiled to native code.

A second method 903, is similar except that instead of using an interpreter, the JAVA bytecode is dynamically compiled into the binary format 940 for the native platform by a Just In Time (JIT) compiler 935. This process occurs inside the virtual machine and is not stored after the program has ended. The newest JAVA JIT technique is called HotSpot and uses a principle where bottlenecks are analyzed and recompiled during program execution. However, the JIT compiler will suffer from a memory overhead of a factor of two or three while executing the same application.

A third method 901 involves the use of cross compilers 910 to compile the JAVA source code into binary format 920 for the native platform. However, the platform independence is lost and the binary program cannot be executed on multiple platforms.

In a fourth method 904, a JAVA operating system 945 and JAVA processor 970 are used to execute the bytecode directly silicon. Some JAVA processors have a folding mechanism, which means that several instructions are combined and executed as one. However, most JAVA processors will execute as an interpreter wherein each opcode is read and then the appropriate action is taken to execute the instruction.

There is no generally preferred run-time environment. Each of these environments can be used with success for different systems depending on their requirements. However, for embedded systems, the use of a JAVA processor (the fourth method 904) is by far the preferred technical solution if JAVA is to be implemented in embedded systems. In recent years, several JAVA virtual machines have been developed for embedded processor platforms. Most of the software solutions aim for 32 bit processors with some 100K memory size. Additionally, some JAVA hardware processors for executing JAVA programs on silicon have also been developed. These processors, which support direct execution of JAVA instructions, implement 32 bits stack machines. Some rely on extensions to the JAVA binary format in order to offer features like direct addressing and bit manipulation instructions. Others do not execute JAVA binary codes directly, but have a very close architectural match to thereby increase performance of the virtual machine. The processors are all targeted for medium to large embedded systems. There are currently no 8 or 16 bit processors available for direct execution of JAVA byte compiled code, even though the eight bit processor market has been considerably larger than the 32 bit processor market.

It is the object of the present invention to provide a microprocessor for executing JAVA byte compiled code in hardware.

It is a further object of the present invention to provide a microprocessor architecture for executing JAVA that is small and power efficient enough to be a preferred solution in small to medium sized embedded applications.

SUMMARY OF THE INVENTION

The above objects have been achieved by a microprocessor for executing byte compiled JAVA code in hardware that includes a RISC processor, a JAVA module for executing a first set of JAVA instructions in the RISC processor, a RISC module for executing a second set of JAVA instructions as microcode in the RISC processor, and a data path in the RISC processor, including a register file, shared by both modules. The JAVA module sees the elements in the register file as a circular operand stack and the RISC module sees the plurality of elements as a register file. The microprocessor architecture is deduced from the observation that, despite JAVA's high semantic content instruction set, it shares a majority of the executed instructions with instructions of a generic RISC processor. The architecture is intended to provide designers of embedded applications with an easy to integrate, small and cost effective processor solution with a well defined programming model. This results in the processor architecture embracing two programming models, making JAVA easy to integrate in small to medium size embedded applications.

BRIEF DESCRIPTION OF THE DRAWINGS

FIG. 1 is a Venn diagram showing the overlap between the JAVA instruction set and a typical RISC instruction set.

FIG. 2 is a block diagram of the architecture of the microprocessor of the present invention.

FIG. 3 is a flow chart showing a normal run sequence for the microprocessor of the FIG. 2.

FIG. 4 is a block diagram of a portion of the register file of the microprocessor of FIG. 2.

FIG. 5 is a block diagram of the complete register file of the microprocessor of FIG. 2.

FIG. 6 is a block diagram illustrating the interrupt handling mechanism of the microprocessor of FIG. 2.

FIG. 7 is a block diagram illustrating the mode transfer mechanism of the microprocessor of FIG. 2.

FIG. 8 is a block diagram illustrating the run time system in which the microprocessor of FIG. 2 would be implemented.

FIG. 9 is a block diagram illustrating the instruction format for the RISC portion of the microprocessor of FIG. 2.

FIG. 10 is a block diagram illustrating the addressing modes for the status registers used in the present invention.

FIGS. 11-16 are timing diagrams illustrating the timing signals during an execution sequence of the microprocessor of FIG. 2.

FIG. 17 is block diagram illustrating various ways to execute a JAVA program on a physical computer platform, as are known in the prior art.

FIG. 18 is a block diagram illustrating the addressing modes for the status registers of the SMILE RISC architecture.

FIG. 19 is a block diagram of the instruction format for the transfer and arithmetic and logic instructions of the SMILE RISC architecture used in the present invention.

FIG. 20 is a block diagram of the instruction format for the control instructions of the SMILE RISC architecture used in the present invention.

FIG. 21 is a block diagram of the instruction format of the LL instructions of the SMILE RISC architecture used in the present invention.

BEST MODE FOR CARRYING OUT THE INVENTION

With reference to FIG. 1, it can be seen that the JAVA instruction set 20 and the typical RISC instruction set 22 overlap. A JAVA Virtual machine instruction consists of an opcode specifying the operation to be performed, followed by zero or more operands embodying values to be performed upon. There are a total of 201 opcodes in the JAVA Virtual machine instruction set. A significant feature of the JAVA Virtual machine instruction set is that a large number of instructions have a high semantic content. These instructions are difficult to implement in silicon. It is usually not feasible to execute the instructions having a high semantic content in one clock cycle, and the task of breaking them up into several less complex instructions is difficult in respect to resource allocation and timing constraints. A large part of the JAVA instructions are type specific and therefore, there are many instructions which have the same semantic meaning.

RISC is an abbreviation for "reduced instruction set computer". The idea behind the RISC architecture is that a simpler instruction set could be executed with a higher clock frequency and more efficient pipe lining, ensuring a higher throughput than in traditional stack machines. The instruction set of a RISC will of course vary from processor to processor but generally it has the following instructions: LOAD, STORE, ADD, SUB, AND, OR, SHIFT, BRANCH. In addition RISC architectures will in general include some form of bit manipulation instructions. Comparing JAVA's instruction set with a generic RISC instruction set, it can be found that most of the RISC instructions appear in the JAVA instruction set. The overlap of common instructions 25 is illustrated in the diagram of FIG. 1. The remaining instructions are divided among the RISC low level bit manipulation instructions 23 and JAVA's high level object creation and manipulation instructions 21. These observations establish the idea that both a RISC and a JAVA stack machine require approximately the same hardware resources. Additionally, a JAVA Virtual machine implementation in silicon needs to support instructions for bit manipulation, direct memory addressing, and trapping of complex opcodes. Also, the most frequently executed instructions in both architectures are the load/store instructions. In both architectures, they have the same semantic content. Implemented on silicon, these instructions could share the same hardware resources. These observations on the nature of the two instruction sets leads to the microprocessor architecture of the present invention.

With reference to FIG. 2, the microprocessor 30 of the present invention includes a JAVA control unit 31 and a RISC control unit 33 which share the same data path. The two control units 31, 33 operate independently but cannot operate simultaneously. In other words, the two virtual processors share one data path but, although they operate independently, they do not operate in parallel. The processor 30 does not rely on translations or extensions to the JAVA binary format like other JAVA processors, but offers two orthogonal programming models. The microprocessor 30 is in principle a von-Neuman architecture, but it can easily be expanded to a Harvard architecture with a separate data and instruction bus. The microprocessor includes a register file 35 having a status register 32 and a program counter 34. The register file is connected to the data bus 40. An arithmetic logic unit (ALU) 42 is connected to the register file 35 and the output of the ALU is supplied to the data bus 40. This is partly because a large part of the critical path goes through the ALU and partly because this is one of the larger modules in an embedded microprocessor. The minimum ALU implementation should perform the operations: ADD, SUB, AND, OR, XOR, MOVE, SET, CLEAR, SHIFT, and ROTATE. The outputs of the register file 35 and the program counter 34 are processed through an adder 36 to an address multiplexer 37. The address multiplexer 37 is also connected to the address bus 41. An instruction fetch decoder 39 receives a signal from the data bus 40 and provides an output to the stack control unit 38.

With reference to FIG. 3, the microprocessor first powers up in the RISC mode of operation in order for the initialization code to execute. After the initialization 52, the microprocessor switches to JAVA mode 53 and starts executing the JAVA program 54. The microprocessor operates in JAVA mode until one of three events occurs: an interrupt 59, an unimplemented JAVA instruction 60, or a designated JAVA opcode for switching back to RISC mode 58. If any of these events occur, the processor will jump to a pre-defined address and switch to RISC mode 55 and in this way handle the event. Upon finishing the RISC routine 56, the processor will switch back to JAVA mode 57 and continue to execute the JAVA code at the point where it left off.

Thus, the JAVA model is able to execute the JAVA parts of the program. Such parts may be network capabilities or algorithms which are already implemented in a company's software library, and constitute modules of legacy software for reuse. The RISC model aids in execution of the JAVA code by executing complex instructions as microcode. It also provides a flexible hardware interface which can be used to, for example, control highly specialized peripheral devices like sensors and actuators. In order to be compatible with the JAVA Virtual machine specification, all JAVA instructions need to be implemented. However, in an embedded processor targeted for small to medium applications, several of the number fotmats supported by the JAVA Virtual machine are excessive. For instance, there are few processors in this segment that offer floating point units. Several of JAVA's more complex instructions have to be trapped and executed as microcode. Which instructions to trap and which to implement directly into hardware is usually an implementation specific issue decided by the designer. Additionally, which RISC instruction set to use depends on the RISC model chosen, as the present invention can also be used with other types of RISC architectures in addition to the RISC architectural described herein.

A key architectural element in the proposed microprocessor architecture is the register file. This module has the function of a push-pop stack in JAVA mode and as a conventional load/store register file in RISC mode. This is also the module which allows the two virtual processors to communicate. With reference to FIG. 4, the RISC part of the architecture 71 sees a register file with N registers, and the RISC architecture interfaces the registers with the data memory through load/store instructions 72, 73, 74. The program counter and status register are included in the register file. In order to preserve orthogonality, these special registers are accessible like any other register. The JAVA control unit 61 sees the same register file as a push-pop stack with M=N/2 elements. Data is pushed 62 into the register stack and is popped 63 out of the register stack to the JAVA control unit. FIG. 4 shows half of the register file as it is seen from the RISC and JAVA modes. The registers 80, 81, 82 are seen by both the JAVA control unit 61 and the RISC portion of the circuit 71. The remaining N/2 registers are used for, among other things, the program counter, status register, scratch registers and stack control registers. The stack is implemented as a circular stack and the stack sizes required are relatively small. The stack size is scalable, and the number of stack elements is left as an implementation specific issue. A stack overflow/underflow can be copied out in the memory 83 through an overflow/underflow mechanism. Possible stack overflow/underflow mechanisms can also be developed in a case-by-case manner.

With reference to FIG. 5, the complete register file 90 is shown. The RISC module can read and write from all the registers and there are no hardware limitations on which registers the RISC module can access. The verification that the RISC module does not overwrite a special register during program execution is done in the software layer. If the programmer wants to use one of the special registers as a temporary memory, it will have to be stored on the RISC module stack if the value in this register needs to be recovered later during the execution. As shown in FIG. 5, the complete RISC register file 90 includes the JAVA operand stack 91 which includes a plurality of registers 92, 93, 94, 95, as was described with reference to FIG. 4. The RISC registers 90 also includes a plurality of special registers. The special registers include a program counter 106, a program counter base 105, a constant pool base address 107, a local variable base address 104, a JAVA stack pointer 103, a status register 101, and a RISC stack pointer 102. Most of these register functions are self-explanatory. The program counter base register 105 is used by the JAVA processor. When a new method is invoked, the JAVA module's program counter is set to zero. The program counter base register stores the address where this method is invoked. On the address bus, this register is added with the program counter in order to fetch instructions from the correct place in the program memory. The local variable base address register 104 performs a similar function. It stores the base address for the local variable in a JAVA method. These registers could of been chosen to reside outside the register file 90. However, it represents an advantage to be able to have these registers inside the register file since the register can be reached by any RISC instruction, rather than having to implement special instructions to operate on special registers. The JAVA stack pointer 103 keeps track of the location of the top of the JAVA operand stack, thus keeps track of the particular register of the M registers from which the operand is going to be fetched or to which the operand is going to be written. The RISC stack pointer 102 points to a place in memory where the RISC can store variables temporarily if the register file is full.

The virtual processors communicate through the register file. The RISC unit executes, amongst others, complex JAVA instructions. These small RISC programs have to fetch their operands from the top of the JAVA operand stack and place the results back to the top of the JAVA operand stack, and at the same time make sure that the JAVA stack pointer is incremented or decremented depending on the operation performed. This presents a problem since the RISC instruction format will only handle static registers. The problem is solved by setting and clearing two status bits in the status register. Each of the status bits controls whether the source (X) or the destination (Y) operand are to be fetched from the register indicated in the instruction or whether the register number is to be dynamically read from the JAVA stack pointer register. The RISC program which replaces a JAVA instruction has to set and clear these bits at the appropriate time. By setting the two bits in the register file, the RISC processor can use the content of the top of stack register as an argument for which register to access.

With reference to FIG. 7, the implementation of the mode transfer mechanism of the microprocessor is shown. The JAVA control 120 and RISC control 122 modules are connected to a multiplexer 124 which produces the control lines 130 to the data path. The status register 126 in the register file contains a control bit 128 which is supplied to the JAVA control module 120, and the RISC control module 122. The control bit 128 also serves as the control input to the multiplexer 124. The control bit determines which of the control units, JAVA control unit 120 or RISC control unit 122, is in operation. Control is transferred at a predefined state in both control modules. Control is therefore transferred synchronously where both machines will be in the same defined state.

The JAVA Virtual machine specification does not describe the concept of interrupts. Therefore interrupts are handled by default by the RISC module. With reference to FIG. 6, the interrupt handling mechanism is shown. In general, when an interrupt occurs, the processor checks that the implementation specific conditions, like specific flags, are true before jumping to a predefined address and switching to RISC mode. Then, the return address is stored on top of the RISC stack. In FIG. 6, the jump address (0x63) 112 is shown to be stored at the predefined address (0xaf) 111. At this predefined address, the jump address is read and an appropriate branch instruction to the new address is performed. Execution continues at this new address in RISC mode. To return to normal program execution, the processor executes the RISC instruction "Return from Interrupt" where the return address is popped off the top of the RISC stack.

The instruction trapping mechanism involves steps similar to the interrupt mechanism. When an unimplemented instruction occurs, the JAVA control module detects this and the return address is stored on the top of the stack. Then, the processor switches to RISC mode and fetches a jump address from a predefined location in the memory. The RISC module then continues execution at the address fetched in the last step. Having the trapping mechanism be similar to the interrupt mechanism achieves maximum flexibility since only the first jump address is predefined in the design. This will enable the software linker to optimally plan the memory usage by only linking the RISC routines for the JAVA opcodes actually present in the program, thus saving precious memory space.

The RISC routine should end by popping the program counter off the top of the stack and saving it in the program counter register. This will ensure that the JAVA program continues at the correct place. Additionally, the microprocessor has a stack overflow/underflow handling mechanism. This mechanism in the JAVA push-pop stack can be implemented by reusing existing logic for instruction trapping. When an overflow occurs, the processor traps the overflow flag and jumps to a predefined address where it finds a jump vector to the software procedure that will handle the overflow/underflow condition.

With reference to FIG. 8, a typical run-time environment for a system with this processor concept is shown. A developer can compile JAVA source code 141 in an ordinary JAVA compiler 142 and end up with JAVA class files 144. If the processor accommodates an operating system with a file loader and an automatic memory management system, the rest of this process can occur dynamically and automatically. However, small embedded systems often do not need an operating system and then the rest of this process must be done manually in the sense that a memory image of the program has to be created on an external platform. The JAVA class files 144 have to be parsed through a linker 148. The program run through the linker will verify that the class file doesn't contain any illegal opcodes, modify codes or operands depending on instrumentation solutions, link the application with the specified JAVA class libraries 145, link an assembly code to the RISC part 143, set up a heap area, set up branch and jump addresses, and make a memory map. The output from the linker will be a memory image which can be transferred to the ROM or flash memory 151 in the embedded system 152. Much of the purpose of making a JAVA processor is that the programmer should be able to use the JAVA programming language as unconstrained as possible. However, in this case, only supported types can be used and only a limited run-time library will be available. These constraints are, however, not limiting for the use of JAVA's main features.

The JAVA Virtual machine specification contains 201 instructions, many of them type specific. The number of instructions hardware implemented, and the number of instructions trapped, depends on the RISC architecture that is used. Other types of RISC architectures will have an effect on the number of instructions hardware implemented and trapped. The following instructions were not hardware implemented in the preferred embodiment of the present invention since these instructions are not considered as important in a small embedded processor: all instructions of type "float", all instructions of type "double", and all instructions of type "long". This eliminates approximately 90 instructions from the 201 possible JAVA instructions. Of the remaining instructions, 68 instructions are implemented in the JAVA Virtual machine and 43 instructions are trapped and are executed as RISC routines. The instructions that are trapped and executed as RISC routines are noted below in Table 1.

TABLE 1

| Opcode | Mnemonics |
|---|---|
| 18 | ldc |
| 46 | iaload |
| 50 | aaload |
| 51 | baload |
| 52 | caload |
| 53 | saload |
| 79 | iastore |
| 83 | aastore |
| 84 | bastore |

TABLE 1-continued

| Opcode | Mnemonics |
|---|---|
| 85 | castore |
| 86 | sastore |
| 90 | dup_x1 |
| 91 | dup_x2 |
| 92 | dup2 |
| 93 | dup2_x1 |
| 94 | dup2_x2 |
| 104 | imul |
| 108 | idiv |
| 112 | irem |
| 170 | tableswitch |
| 171 | lookupswitch |
| 172 | ireturn |
| 173 | lreturn |
| 176 | areturn |
| 177 | return |
| 178 | getstatic |
| 179 | putstatic |
| 180 | getfield |
| 181 | putfield |
| 182 | invokevirtual |
| 183 | invokespecial |
| 184 | invokestatic |
| 185 | invokeinterface |
| 187 | new |
| 188 | newarray |
| 189 | anewarray |
| 190 | arraylength |
| 191 | athrow |
| 192 | checkcast |
| 193 | instanceof |
| 194 | monitorenter |
| 195 | monitorexit |
| 197 | multianewarray |

With these implementation choices, approximately 70% of the executed instructions will be executed in the processor directly, while approximately 30% will be trapped and executed as RISC programs. These percentages are derived from dynamic measurements.

For the RISC architecture, the SMILE RISC architecture was chosen. SMILE is an abbreviation for "Scalable Microcontroller Library Element" and was developed by Andrew K. Betts at University College London and is described in several publications, including:

A. K. Betts, I. Bolsens, F. Sicard, M. Renaudin, and A. Johnstone, SMILE, a scalable microcontroller library element. In *Proceedings of Euromicro*, 1993;

A. K. Betts, I. Bolsens, E. Sicard, M. Renaudin, and A. Johnstone, SMILE, a scalable microcontroller library element, *Microprocessors and Microprogramming*, 39:259-262, 1994; and A. K. Betts, SMILE, scalable microcontroller library element, functional specification, V.6. Technical report, University College London, 1993. The essential details of the SMILE specification are described below at the end of this section. SMILE is targeted for small embedded systems and has certain scalability qualities. The virtual RISC of the present invention implements a modified SMILE instruction set, except that the instructions format was slightly changed in order to accommodate 32 register addressing as is shown in FIG. 9. Additionally, the status registers in the present invention have been modified from the standard SMILE specification registers that are discussed with reference to FIG. 18 below. The status registers of the present invention are shown in FIG. 10 and include a read/write register SR1 180, and a second register SR2 having a read only portion 185 and a write only portion 188. The read/write register SR1 180 includes the JAVA flag 183, discussed above with reference to FIG. 6, and also includes the Rx 182 and Ry 181 flags, which will be described below with reference to FIG. 14. The remaining bits in the register are the same as in the SMILE specification, which is described below with reference to FIGS. 18-21. Additionally, the range of some instructions were expanded, all registers are defined as type "long", the register scaling parameters have been changed, and some new instructions were added. The new instructions are: return from JAVA trap (RJ), RISC to JAVA control transfer (R2J), shift JAVA alignment left (SJL), and shift JAVA alignment right (SJR). The semantics of these new instructions are described below with reference to FIGS. 11-16.

The signals shown in each of FIGS. 11-16 are the reset signal 241, the clock signal 242, the JAVA instruction register 243, the RISC instruction register 244, the JAVA flag 245, the data bus 246, the program counter 247, the address bus 248, the JAVA Stack pointer 249 and the actual time 250. Also, the instruction sequences 201-206 for each time period are shown.

In FIG. 11, the first ten clock cycles are shown. After the reset signal 241 goes inactive, the processor is in RISC mode and initializes by executing the instruction it reads at address 0x0000. It then executes a series of load instructions to initialize the special registers Stack Pointer, Local Variable Base Address, and Program Counter Base Address. The initialization described is valid for a reset routine. A JAVA call would include initializing only the Local Variable Base Address and the Program Counter Base Address. In addition, the Constant Pool Base Address would have to be initialized if a new class was called. At time 95, the processor executes the instruction R2J which is equivalent to setting bit six in the status register.

After the instruction R2J is executed, the processor switches to JAVA mode in the next clock cycle. The transfer of control is seamless as shown in 12. Note that the JAVA flag signal 245 is set high at time 105 and that the program counter 247 is set to zero as all JAVA methods start at zero. The address on the address-bus 248 is the sum of the Program Counter and the Program Counter Base Address registers.

As shown in FIG. 13, at time 215, the JAVA instruction "istore <index>" is executed ("36" in JAVA instruction register 243). This instruction pops a variable of "Top of Stack" and stores it into a local variable at address "<index>". It can be seen that the number "0" (see databus 246) is stored into address "184" on the address bus 248. The address is calculated from LV base address plus PC base address plus the operand <index> which belonged to the instruction. Here <index> was 0x4 thus the address is 0x69+0x4B+0x04=0xB8=184. In addition, it can be observed that the Top of Stack pointer 249, which points to the register that is currently "Top of Stack", is decremented as the number is popped off the stack.

Execution of "istore" at time 215 takes two clock cycles as shown in FIG. 13. Later in the same figure, an "istore" is executed again at time 245. This time, the alignment of the instruction in memory forces the opcode and the operand to be read on different clock cycles. The execution of this instruction is thus done in three clock cycles.

At time 315 in FIG. 4, the JAVA control module reaches the unimplemented instruction "newarray". This instruction is trapped. The trap sequence takes four clock cycles as described above. At the 350, the end of the top sequence, the JAVA flag goes low. The processor now starts executing the instruction newarray as a RISC routine. The instruction should initialize an array and return the start address for the array. The RISC instructions SJL and SJR are move instructions to handle the alignment of the JAVA opcodes in the memory.

With reference to FIG. 15, the JAVA stack pointer has a post-increment function. At time 435 the stack pointer is decremented in order for the RISC to access the correct register. Next, at time 455 in FIG. 14, the RX flag is set in the status register. This means that the RISC reads the JAVA Stack Pointer register to determine the "Top of Stack" and uses this as the RX register in the next instructions. This is what happens at time 465 where a constant is loaded into "Top of Stack". This constant is the return value from the RISC routine returning the address of the newly created array. In this example, the array is static and the return value is therefore loaded as a constant.

Finally, the JAVA stack pointer is incremented again at time 495 before the RISC returns control to the JAVA module again at time 515 in FIG. 16. The processor then continues to execute in JAVA mode.

Smile Specification

As discussed above, the SMILE RISC specification was chosen in the implementation of the present invention. The specification of the SMILE implementation used in the present invention is described herein.

The SMILE microcontroller must satisfy the following requirements: scalable size, design simplicity, moderate speed and moderate code efficiency. SMILE would typically be part of a larger system including timers, memory and some form of analog interface. The design will follow RISC principles whenever this is practical and relevant. The compact instruction set (24 instructions) will have the following features:

*Uniformity: Every type of operation wilt be applicable to all processor registers and all combinations of processor registers in the same way (with the exception of some operations on the status register), and all instructions will be conditioned.

*Completeness: The instruction set will be complete with respect the application area of embedded control.

*Orthogonality: The instruction set will be orthogonal, and there will be no undecoded instructions,

*Parameterization & Scalability: as the user may be in a position to modify the core hardware, the design will be parameterized. It will also be possible to scale the design according to the width of the memory, with the smallest width being 4 bits. Functionality will degrade gracefully as the memory width is reduced. Finally, expansion of the instruction set will be allowed through the addition of application specific instructions.

The following three parameters will be specified in order to characterize a particular version of SMILE:

| WSR | Width of short register in bits | WSR | $\geq 4$ |
|-----|--------------------------------|-----|----------|
| WIR | Width of instruction register | WIR | $\geq 12$ |
| NRE | Number of registers | NRE | $\geq 8$ |

The following restrictions apply to the choice of the above parameters. NRE is a power of 2.

| $6 \leq$ | $WIR - 2\log_2$ | $(NRE)$ | $\leq 10$ |
|----------|------------------|---------|-----------|

SMILE versions will be specified as SMILEWSR_WIR_NRE. The following parameters are derived from the above:

| | | |
|---|---|---|
| WRF | Width of register field in insn | $2 \cdot \log_2$ (NRE) |
| WCF | Width of condn. field in insn. | WIR − WRF − 6 |
| NIS | Number of segs in insn reg | (WTR + WSR − 1)/WSR (integer truncated) |
| WLR | Width of long registers | $2 \cdot$ WSR |
| WIF | Width of instruction field | =3 |
| WAF | Width of address-mode fields | =3 |
| NSR | Number of short registers | $2^{(WRD/2)}/2$ |
| NLR | Number of long registers | NSR |
| NPA | Number of process addresses | $2^{WLR}$ |
| NTA | Number of total addresses | $2^{2WLR}$ |

The processor switches between processes on interrupt. Each process will see a set of NSR+NLR General Purpose Registers. Register L[NLR−1] will be the program counter, PC.

Register L[0] will be the stack pointer, SR Register S[NSR−1] will be the Interrupt Control and Status Register, SR. Registers designated "local" are stacked on interrupt. The local registers are to be the Program Counter, PC (L[NLR−1]), the Status Register, SR ((S[NSR−1]), and the Memory Configuration Register, MCR. All other registers will be designated "global". When short registers are combined in an operation with long registers, or they are used as an address, they are zero-extended. This allows the short registers to be used to point to the first page ($2^{WSR}$ locations) of data memory.

Status information is held in two registers, SR1 and SR2, as defined by the following diagram. The addressing modes used to access this information are shown in FIG. 18 and are described below.

With reference to FIG. 18, the status bits are as follows:
SR1 (read/write), 411:
U User bit—no dedicated function
N Negative flag
V Overflow flag
Z Zero flag
C Carry flag
SR2 (read only), 421:
M=Z+Cbar (convenient access to condition "lower or same")
I=Z+L (convenient access to condition "less or equal")
L=N^V (convenient access to condition "less")
E interrupts enabled when this is set
3SR2 (write only), 422:
S holds results of TB & FB instructions set to 1 by other instructions
K set to 1 unless instruction explicitly clears
P set to 1 unless instruction explicitly clears
E as above For this version of the specification, data and instruction memories will be identical, Memory accesses that use the program counter as a pointer will read instruction memory, while all others will read or write data memory (nb, immediate constants are therefore in instruction memory). Accesses to instruction memory are read-only. Memory will be accessed as shorts or longs, depending on the operation. The high and low parts of longs will be ordered according to the little endian convention.

The instruction set is noted in Table 2 below:

TABLE 2

| | | Operation | Flags |
|---|---|---|---|
| | | Transfers | |
| LD | Ax, Ay load | Ax <= Ay | SZ |
| ST | Ax, Ay store | Ay <= Ax | SZ |
| | | Arithmetic and Logical | |
| AD | Ax, Ay add | Ax <= Ax + Ay + C Kbar | SCZNV |
| SU | Ax, Ay substract | Ax <= Ax − Ay − C bar Kbar | SCZNV |
| AN | Ax, Ay and | AxAy | SZN |
| OR | Ax, Ay or | Ax \| Ay | SZN |
| EO | Ax, Ay exclusive or | Ax ^ Ay | SZN |
| | | Manipulation and Test | |
| TB | Ax, n test bit n(0 . . . 3) for True | S <= Ax · $2^n$ | SZ |
| FB | Ax, n test bit n(0 . . . 3) for False | S <=! (Ax · $2^n$) | SZ |
| SB | Ax, n set bit n(0 . . . 3) | Ax <= Ax + $2^n$ | SZ |
| CB | Ax, n clear bit n(0 . . . 3) | Ax <= Ax · ($2^n$) bar | SZ |
| SL | Ax, n shift left n(1, 2, 4) | Ax <= Ax << n(shifting in 0) | SCZ |
| SR | Ax, n shift right n(1, 2, 4) | Ax <= Ax >> n(shifting in 0) | SCZ |
| SA | Ax, n shift arith. n(1, 2) | Ax <= Ax >> n(shifting in ms_bit) | SCZ |
| RL | Ax, n rotate left n(1, 2, 4) | Ax <= Ax << n(shifting in msb) | SCZ |
| RR | Ax, n rotate right N(1, 2, 4) | Ax <= Ax >> n(shifting in lsb) | SCZ |
| RC | Ax, d rotate carry (d = L/R) | Ax rotated 1 bit L/R through carry | SCZ |
| | | Control | |
| BR | <offset> branch | PC <= PC + (signed) offset | S |
| JS | <laddr> jump subroutine | stack PS, PC <= <laddr> | S |
| JI | <daddr> jump with int. | see text | S |
| RI | return from int. | see text | S |

TABLE 2-continued

|  |  |  | Operation |  | Flags |
|---|---|---|---|---|---|
|  |  |  | Version specific |  |  |
| LL | Ax, n |  | load literal n | Ax <= n | SZ |
| VS | n |  | vectored subroutine | see text | S |
| FN | n, [<arg>] |  | function n | not specified | S | nb. abbreviations:
<offset> signed offset, length WSR
<laddr> absolute address, length WLR
<dladdr> absolute address, length 2 WLR (for PC + MCR)
<constant> immediate constant value
|<arg>| unspecified optional parameter to pass to function The following are attributes of the instruction set shown in Table 2. ST x,y is not an allowed instruction. Status bits K and P are affected by all instructions. All instructions may have a further field <cdn> added to specify a condition (not shown in above table). If this is not specified, then the default condition tests the S bit. This bit is set by all instructions except TB and FB, which sets or clears it depending on the result of the test. Instructions are always executed, and the appropriate status bits set. However, the results are only stored if <cdn> is true. The y result is always stored in pre-decrement and post-increment instructions. The VS instruction is identical to the JS instruction, except that the jump address is not required to follow the instruction. Instead, this address is fetched from an address table that is internal to the SMILE core, and the index used to retrieve the appropriate address is n—the VS argument. This instruction therefore allows a subroutine jump where the destination of the jump is coded into the instruction itself.

The addressing modes for the Ax operand are defined as follows:

| addressing mode | <operand> | effective address for Ax |
|---|---|---|
| simple | x | x |
| indirect (xid) | (x) | M[x] |

The addressing modes for the Ay operand are defined as follows:

| addressing mode | <operand> | effective address for Ay |
|---|---|---|
| Register | y | y |
| pre-decr | -(y) | M[y - 1], y decremented |
| post-incr | (y)+ | M[y], y incremented |
| displacement | <disp>(y) | M[<disp> + y] |
| immediate | <constant> | M[PC] |

For displacement mode, the displacement follows the instruction in memory. For post-incr and pre-decr modes, the increment/decrement value=1 if the register in the x field is short, else=2. <disp> is a displacement, the same width as y. It is added to y and then the result zero-extended so that, when y is short, the mode can be used to access any element of the first page of memory. The arguments Ax and Ay are always treated as having the same width as register x. If the y addressing mode is "register" and y is longer than x, then the least significant part of y is used for the operation. If the y addressing mode is "register" and y is shorter than x, then y is zero-extended for the operation. The status register address has a special logical interpretation:

| Instruction argument | Effective argument |
|---|---|
| Ax = SR | Ay = SR1 |
| Ax = (SR) | Ay = SR2 |
| Ay = SR | Ay = SR1 |
| Ay = -(SR) | Ay = -(SR) |
| Ay = (SR)+ | Ay = (SR)+ |
| Ay = <disp>(SR) | Ay = M[<disp>] |

S, K and Y are set to one every instruction, unless otherwise specified.

Table 3 defines the status calculations, where:

Ax_result denotes the result of the calculation for Ax which, in filet, will only be stored if the condition corresponding to the operation is met. Ay_result denotes the result of the calculation of the effective address for the y field in pre-decrement, post-increment and displacement addressing modes.

TABLE 3

|  |  | Transfers |
|---|---|---|
| LD | Ax, Ay | Z = if (Ax_result == 0 ? 1:0) |
| ST | Ax, Ay | Z = if (Ay_result == 0 ? 1:0) |
|  |  | Arithmetic and Logical |
| AD | Ax, Ay | C = if (carry out of Ax_result ? 1:0) |
|  |  | Z = if (Ax_result == 0 ? 1:0) |
|  |  | N = msbit of Ax_result |
| SU | Ax, Ay | C = if (borrow from Ax_result ? 0:1) |
|  |  | Z = if (Ax_result == 0 ? 1:0) |
|  |  | V = if (overflow of Ax_result ? 1:0) |
|  |  | N = msbit of Ax_result |
| AN | Ax, Ay | Z = if (Ax_result == 0 ? 1:0) |
|  |  | N = msbit of Ax_result |
| OR | Ax, Ay | Z = if (Ax_result == 0 ? 1:0) |
|  |  | N = msbit of Ax-result |
| EO | Ax, Ay | Z = if (Ax_result == 0 ? 1:0) |
|  |  | N = msbit of Ax_result |
|  |  | Manipulation and Test |
| TB | Ax, n | S = Ax · $2^n$ |
|  |  | Z = Ax · $2^n$ |
| FB | Ax, n | S = ! (Ax · $2^n$) |
|  |  | Z = ! (Ax · $2^n$) |
| SB | Ax, n | Z = if (Ax_result == 0 ? 1:0) |
| CB | Ax, n | Z = if (Ax_result == 0 ? 1:0) |
| SL | Ax, n | C = if (carry out of Ax_result ? 1:0) |
|  |  | Z = if (Ax_result == 0 ? 1:0) |
| SR | Ax, n | C = if (carry out of Ax_result ? 1:0) |
|  |  | Z = if (Ax_result == 0 ? 1:0) |
| SA | Ax, n | C = if (carry out of Ax_result ? 1:0) |
|  |  | Z = if (Ax_result == 0 ? 1:0) |
| RL | Ax, n | C = if (carry out of Ax_result ? 1:0) |
|  |  | Z = if (Ax_result == 0 ? 1:0) |

TABLE 3-continued

| | | |
|---|---|---|
| RR | Ax, n | C = if (carry out of Ax_result ? 1:0) |
| | | Z = if (Ax_result == 0 ? 1:0) |
| RC | Ax, d | C = if (carry out of Ax_result ? 1:0) |
| | | Z = if (Ax_result == 0 ? 1:0) |
| | | Version Specific |
| LL | Ax, n | Z = if (Ax_result == 0 ? 1:0) |

The code for an immediate mode instruction, IN Ax, <constant>, is identical to the code for IN Ax, (PC)+, followed by the <constant> value, where the latter value has the size of the x register. In this context, IN stands for LD|ST|AD|SU|AN|OR|EO. The instruction format for LD, ST, AD, SU, AN, OR, EO is shown in FIG. 18, where instr 506 is the instruction field, ax (formerly id) 504 is the addressing mode field for x, ay 503 is the addressing mode field for y, cdn 505 is the condition field and rx, ry 501, 502 are the register fields. The arrangement of the fields in FIG. 19 is with the rx field 501 at the most significant end. For BR, JS, JI, RI, VS and FN the format is shown in FIG. 20. In this case, the fields corresponding to instr, ay and ax of format 1 are occupied with the codes corresponding to ST 555, "register" 552 and "simple" 553 respectively. The remaining three fields must then be divided up into a part that specifies the instruction 551 and a part which specifies the condition 554. The condition part is the four least significant bits of the combined field. The remaining instructions are termed "manipulate" instructions (MA instructions). The LL instructions is included in this category. Their format is shown in FIG. 21. The number of bits available to code the MA instructions 582 will be a function of WIR and NRE, and the minimum number of bits will be 5. This is sufficient to allow the coding of the instructions from TB to RC in the instruction table above. Surplus bits are used to code the instructions LL, where the number of literals that can be coded will depend on the number of surplus bits available.

The fields of the SMILE instruction are coded as follows:

| | instr: |
|---|---|
| 000 | LD |
| 001 | ST |
| 010 | AD |
| 011 | SU |
| 100 | AN |
| 101 | OR |
| 110 | EO |
| 111 | MA (i.e. the code in the instr field for all the manipulate instructions.) |

| | ax: |
|---|---|
| 0 | Ax = x |
| 1 | Ax = (x) |

| | ay: |
|---|---|
| 00 | Ay = y |
| 01 | Ay = -(y) |
| 10 | Ay = (y)+ |
| 11 | Ay = #(y) |

The remaining fields do not have fixed width and so the following specifications must be interpreted according to the number of bits available in a particular application.

| | rx and ry: | |
|---|---|---|
| 000 ... 000 | S[0] | |
| 000 ... 001 | S[1] | |
| etc ... | | |
| 011 ... 111 | S[NSR − 1] | (=SP) |
| 100 ... 000 | L[0] | (=SP) |
| 100 ... 001 | L[1] | |
| etc ... | | |
| 111 ... 111 | L[NLR − 1] | (=PC) |

| | cdn: | |
|---|---|---|
| 0000 | S | if_set ("always") |
| 0001 | Sbar | if_not_set ("never") |
| 0010 | C | if_carry |
| 0011 | Zbar | if_not_zero |
| 0100 | Cbar | if_not_carry |
| 0101 | Z | if_zero |
| 0110 | N | if_negative |
| 0111 | V | if_overflow |
| 1000 | Nbar | if_not_negative |
| 1001 | Vbar | if_not_overflow |
| 1010 | L | if_less (<0) |
| 1011 | Lbar | if_ge ($\geq 0$) |
| 1100 | l | if_le ($\leq 0$) |
| 1101 | M | if_ls (lower/same) |
| 1110 | lbar | if_gt (>0) |
| 1111 | Mbar | if_hi (higher) |

| | control_instr: | |
|---|---|---|
| 00 ... 000 | BR | |
| 00 ... 001 | JS | |
| 00 ... 010 | JI | |
| 00 ... 011 | RI | |
| 00 ... 100 | VS | 4 |
| 00 ... 101 | VS | 5 |
| etc ... | | |
| 11 ... 111 | VS | $2^{n-1}$ (n == width of bit field for control_instr) |

If application-specific instructions are implemented, then they take the codes of the highest numbered VS codes.

| | ma_instr: | |
|---|---|---|
| 00 ... 000000 | LL | 0 |
| 00 ... 000001 | LL | 1 |
| 00 ... 000010 | LL | 2 |
| etc ... | | |
| 11 ... 011111 | LL | $2^{n-1}$ − 32 (n == width of bit field for ma_instr) |
| 11 ... 100000 | TB | 0 |
| 11 ... 100001 | TB | 1 |
| 11 ... 100010 | TB | 2 |
| 11 ... 100011 | TB | 3 |
| 11 ... 100100 | FB | 0 |
| 11 ... 100101 | FB | 1 |
| 11 ... 100110 | FB | 2 |
| 11 ... 100111 | FB | 3 |
| 11 ... 101000 | SB | 0 |
| 11 ... 101001 | SB | 1 |
| 11 ... 101010 | SB | 2 |
| 11 ... 101011 | SB | 3 |
| 11 ... 101100 | CB | 0 |
| 11 ... 101101 | CB | 1 |
| 11 ... 101110 | CB | 2 |
| 11 ... 101111 | CB | 3 |
| 11 ... 110000 | SL | 1 |
| 11 ... 110001 | SR | 1 |
| 11 ... 110010 | RL | 1 |
| 11 ... 110011 | RR | 1 |
| 11 ... 110100 | SL | 2 |
| 11 ... 110101 | SR | 2 |
| 11 ... 110110 | RL | 2 |
| 11 ... 110111 | RR | 2 |
| 11 ... 111000 | SL | 4 |
| 11 ... 111001 | SR | 4 |

-continued

| | | |
|---|---|---|
| 11...111010 | RL | 4 |
| 11...111011 | RR | 4 |
| 11...111100 | SA | 1 |
| 11...111101 | SA | 2 |
| 11...111110 | RC | L |
| 11...111111 | RC | R |

The invention claimed is:

1. A microprocessor comprising:
a processor;
a first module to execute a set of instructions in bytecode in the processor;
a RISC module to execute a set of instructions as microcode in the processor; and
a datapath in the processor shared by both modules, the datapath including a register file shared by both modules, the first module seeing a first portion of the register file as a circular operand stack and a further portion as storage registers, and the RISC module seeing register file as a register file.

2. The microprocessor of claim 1 wherein the register file includes a control bit for tracking which module is in operation.

3. The microprocessor of claim 1 wherein the register file includes a program counter containing the address of an instruction to be executed.

4. The microprocessor of claim 1 wherein the register file includes a local variable base address to store base address information for local variables in a method.

5. The microprocessor of claim 1 wherein the register file includes a stack pointer to track a location of the top of the operand stack.

6. The microprocessor of claim 1 wherein the register file includes a RISC stack pointer to point to a location where the RISC can temporarily store variables if the register file is full.

7. The microprocessor of claim 1 wherein the register file includes a status register having a pair of status bits that inform the RISC module to use a value of the top of the operand stack as a register operand when executing an instruction, each of the pair of status bits controlling a source or a destination operand.

8. The microprocessor of claim 7 wherein when the status bits are set, the RISC module disregards the source or destination operand and uses the contents of a predefined register as the source or destination operand.

9. The microprocessor of claim 7 wherein the status bits are set and cleared by a RISC program that replaces the bytecode instruction.

10. A microprocessor comprising:
a processor;
a first module to execute a set of instructions in bytecode in the processor;
a RISC module to execute a set of instructions as microcode in the processor, the RISC module including an interrupt handler; and
a datapath in the processor shared by both modules, the datapath including a register file shared by both modules, the register file having a local variable base address to store base address information for local variables in a method, the first module seeing a first portion of the plurality of the register file as a circular operand stack and a remaining portion of the plurality of elements as storage registers, and the RISC module seeing the register file as a register file.

11. The microprocessor of claim 10 wherein the register file includes a control bit for tracking which module is in operation.

12. The microprocessor of claim 11 wherein the register file includes a program counter containing an address of an instruction to be executed.

13. The microprocessor of claim 12 wherein the register file includes a program counter base register for storing an address of a new method to be invoked.

14. The microprocessor of claim 13 wherein the register file includes a stack pointer to track a location of a top of the operand stack.

15. The microprocessor of claim 14 wherein the register file includes a RISC stack pointer to point to a location where the RISC module can temporarily store variables if the register file is full.

16. The microprocessor of claim 10 wherein the register file includes a status register having a pair of status bits that inform the RISC module to use a value from on top of the operand stack as a register operand when executing an instruction, each of the pair of status bits controlling a source or a destination operand.

17. The microprocessor of claim 16 wherein when the status bits are set, the RISC module disregards the source or destination operand and uses the contents of a predefined register as the source or destination operand.

18. The microprocessor of claim 17 wherein the status bits are set and cleared by a RISC program that replaces the bytecode instruction.

19. A processor implemented method comprising:
executing a set of instruction as bytecode in the processor with a first module;
executing a set of instructions as microcode in the processor with a RISC module;
interrupting the processor when an instruction too complex for execution by the first module appears;
executing the complex instruction separately from other instructions in the RISC module; and
returning to the first module when the RISC module has finished executing the complex instruction.

20. The method of claim 19 wherein the interrupting the processor includes:
jumping to a predefined address and reading a new branch address;
executing a branch instruction to the new branch address in the RISC module; and
executing a return instruction to return to program execution using the first module.

* * * * *

UNITED STATES PATENT AND TRADEMARK OFFICE
CERTIFICATE OF CORRECTION

| | |
|---|---|
| PATENT NO. | : 8,166,280 B2 |
| APPLICATION NO. | : 13/030984 |
| DATED | : April 24, 2012 |
| INVENTOR(S) | : Oyvind Strom |

It is certified that error appears in the above-identified patent and that said Letters Patent is hereby corrected as shown below:

Page 2, Column 2, line 6 (Other Publications), please delete "Archicture" and insert therefor --Architecture--;

Page 2, Column 2, line 7 (Other Publications), please delete "Dept.of" and insert therefor --Dept. of--;

Page 2, Column 2, line 8 (Other Publications), please delete "Norweagian Universityof" and insert therefor --Norwegian University of--;

Column 1, line 14, please delete "HELD" and insert therefor --FIELD--;

Column 1, line 66, after "directly", please insert --in--;

Column 4, lines 21-22, please delete "von-Neuman" and insert therefor --von-Neumann--;

Column 4, line 64, please delete "fotmats" and insert therefor --format--;

Column 5, line 62, please delete "of" and insert therefor --have--;

Column 8, line 44, please delete "F." and insert therefor --E.--;

Column 8, lines 45-46, please delete "element." and insert therefor --element,--;

Column 9, line 34, before "12", please insert --FIG.--;

Column 9, line 58, please delete "4" and insert therefor --14--;

Column 10, line 33, please delete "wilt" and insert therefor --will--;

Column 10, line 39, after "respect", please insert --to--;

Signed and Sealed this
Tenth Day of July, 2012

David J. Kappos
*Director of the United States Patent and Trademark Office*

CERTIFICATE OF CORRECTION (continued)
U.S. Pat. No. 8,166,280 B2

Column 10, line 41, please delete "instructions," and insert therefor --instructions.--;

Column 11, line 22, please delete "SR." and insert therefor --SP--;

Column 12, line 23, please delete "indentical," and insert therefor --identical.--;

Column 14, line 32, please delete "filet" and insert therefor --fact,--; and

Column 18, line 42, claim 19, before "too", please insert --is--.